United States Patent
Bode et al.

(10) Patent No.: US 7,103,439 B1
(45) Date of Patent: Sep. 5, 2006

(54) METHOD AND APPARATUS FOR INITIALIZING TOOL CONTROLLERS BASED ON TOOL EVENT DATA

(75) Inventors: Christopher A. Bode, Austin, TX (US); Alexander J. Pasadyn, Austin, TX (US); Anthony J. Toprac, Austin, TX (US); Joyce S. Oey Hewett, Austin, TX (US); Anastasia Oshelski Peterson, Austin, TX (US); Thomas J. Sonderman, Austin, TX (US); Michael L. Miller, Cedar Park, TX (US)

(73) Assignee: Advanced Micro Devices, Inc., Austin, TX (US)

(*) Notice: Subject to any disclaimer, the term of this patent is extended or adjusted under 35 U.S.C. 154(b) by 876 days.

(21) Appl. No.: 09/824,301

(22) Filed: Apr. 2, 2001

(51) Int. Cl.
*G06F 19/00* (2006.01)

(52) U.S. Cl. .................. 700/121; 700/31; 700/46; 700/52; 700/96; 700/110; 700/175; 700/177

(58) Field of Classification Search ............ 700/29–31, 700/46, 52, 93, 95–97, 108–110, 117, 119, 700/121–123, 160, 174–178
See application file for complete search history.

(56) References Cited

U.S. PATENT DOCUMENTS

| | | | | |
|---|---|---|---|---|
| 5,432,702 A | * | 7/1995 | Barnett ..................... 364/468 |
| 5,546,312 A | * | 8/1996 | Mozumder et al. ..... 364/468.03 |
| 5,659,467 A | * | 8/1997 | Vickers ......................... 700/9 |
| 5,861,320 A | * | 1/1999 | Shiraishi ..................... 438/16 |
| 5,886,896 A | * | 3/1999 | Lantz et al. .......... 364/468.23 |
| 5,920,796 A | * | 7/1999 | Wang et al. ................ 438/700 |
| 6,041,270 A | * | 3/2000 | Steffan et al. .............. 700/121 |
| 6,110,214 A | * | 8/2000 | Klimasauskas ................ 703/2 |
| 6,169,931 B1 | * | 1/2001 | Runnels ....................... 700/97 |
| 6,197,604 B1 | * | 3/2001 | Miller et al. ................ 438/14 |
| 6,303,395 B1 | * | 10/2001 | Nulman ....................... 438/14 |
| 6,442,445 B1 | * | 8/2002 | Bunkofske et al. ......... 700/108 |
| 6,521,466 B1 | * | 2/2003 | Castrucci ........................ 438/5 |
| 2001/0039462 A1 | * | 11/2001 | Mendez et al. ............... 700/45 |
| 2002/0055801 A1 | * | 5/2002 | Reiss et al. ................. 700/111 |
| 2002/0116083 A1 | * | 8/2002 | Schulze ...................... 700/108 |
| 2002/0147960 A1 | * | 10/2002 | Jevtic et al. .................. 716/19 |

OTHER PUBLICATIONS

Michael Quirk, "Semiconductor Manufacturing Technology" Dec. 15th 2000, Prentice Hall, 1st edition.*

(Continued)

*Primary Examiner*—Leo Picard
*Assistant Examiner*—Sean Shechtman
(74) *Attorney, Agent, or Firm*—Williams, Morgan and Amerson

(57) ABSTRACT

A method for initializing process controllers based on tool event data includes providing a tool having a process controller adapted to employ a control model to control an operating recipe of the tool; receiving a tool event notification; and initializing the control model in response to receiving the tool event notification. A manufacturing system includes a tool and a process controller. The tool is adapted to process wafers in accordance with an operating recipe. The process controller is adapted to employ a control model to control the operating recipe in accordance with a control algorithm. The process controller is further adapted to receive a tool event notification and initialize the control model in response to receiving the tool event notification.

28 Claims, 2 Drawing Sheets

OTHER PUBLICATIONS

Fukuda, "Advanced Process Control Systems Description of an easy-to-use control system incorporating pluggable modules" 1999, IEEE.*

Karzhavin, "Advanced Process Control Project at Infineon Technologies, Richmond" Feb. 2nd 2002, Future Fab Intl. vol. 12, p. 12.*

Marsden, "Automatic Data Collection Baseline Requirements: Levels 1 and 2 Events and Variables" Oct. 31st 2000, Technology Transfer # 00094004A-ENG, International SEMATECH Inc., pp. 2 and 20.*

U.S. Appl. No. 60/194,237.*

* cited by examiner

METHOD AND APPARATUS FOR INITIALIZING TOOL CONTROLLERS BASED ON TOOL EVENT DATA

BACKGROUND OF THE INVENTION

1. Field of the Invention

This invention relates generally to semiconductor device manufacturing and, more particularly, to a method and apparatus for initializing process controllers based on tool event data.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies.

In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-polishing results as close to a target value as possible. Reducing variation in this manner leads to increased throughput, reduced cost, higher device performance, etc., all of which equate to increased profitability.

Commonly, a processing tool undergoes periodic preventative maintenance procedures or calibrations to keep the tool in optimum operating condition. For example, polishing tools include polishing pads that are periodically conditioned or replaced. Etch tools and deposition tools are periodically cleaned using both in situ cleans or complete disassembly cleans. Steppers are periodically calibrated to maintain alignment accuracy and exposure dose consistency.

The discrete maintenance activities, collectively referred to as tool events, often cause step changes in the processing characteristics of the tool. The control routines implemented by an automated process controller on the tool may experience problems as a result of these changes. For example, a process controller for a chemical mechanical polishing (CMP) tool uses the blanket wafer removal rate of a polishing pad for modeling the performance (e.g., polishing rate) of the polishing tool. After a pad is conditioned or replace, the blanket wafer removal rate changes, thus disrupting the model. If the process controller attempts to control the CMP tool under the new processing characteristics, the polishing process may be poorly controlled or may even result in an unstable control algorithm. These control problems may result in increased variation or even defective wafers. Over time, the process controller may adjust its performance model based on post-processing metrology feedback, however, the wafers produced in the interim may be suspect. In some situations, the process controller might never be able to stabilize the process. Similar control problems may be experienced by process controllers on other tools.

The present invention is directed to overcoming, or at least reducing the effects of, one or more of the problems set forth above.

SUMMARY OF THE INVENTION

One aspect of the present invention is seen in a method for initializing process controllers based on tool event data. The method includes providing a tool having a process controller adapted to control an operating recipe of the tool; receiving a tool event notification; and initializing the process controller in response to receiving the tool event notification.

Another aspect of the present invention is seen in a manufacturing system including a tool and a process controller. The tool is adapted to process wafers in accordance with an operating recipe. The process controller is adapted to control the operating recipe in accordance with a control algorithm. The process controller is further adapted to receive a tool event notification and initialize the control algorithm in response to receiving the tool event notification.

BRIEF DESCRIPTION OF THE DRAWINGS

The invention may be understood by reference to the following description taken in conjunction with the accompanying drawings, in which like reference numerals identify like elements, and in which.

Figure 1:
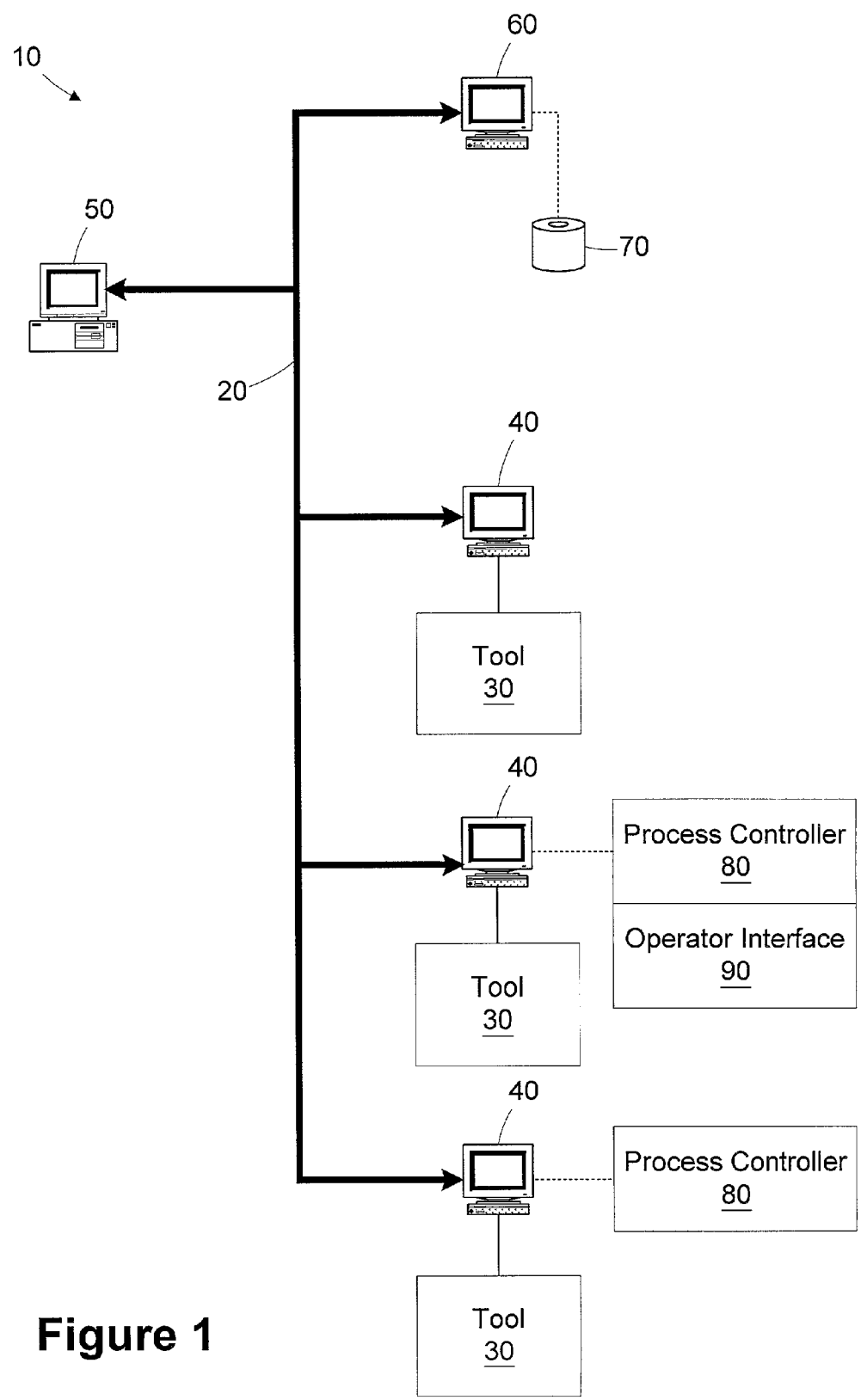
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. A network 20 interconnects various components of the manufacturing system, allowing them to exchange information. The illustrative manufacturing system 10 includes a plurality of tools 30, each being coupled to a computer 40 for interfacing with the network 20. A process control server 50 directs the high level operation of the manufacturing system 10 by directing the process flow of the manufacturing system 10. The process control server 50 monitors the status of the various entities in the manufacturing system, including the tools 30. A database server 60 is provided for storing data related to the status of the various entities and articles of manufacture (e.g., wafers) in the process flow. The database server 60 may store information in one or more data stores 70. The data may include pre-process and post-process metrology data, tool states, process flow activities (e.g., scheduled maintenance events, processing routes for lots of wafers), etc. The distribution of the processing and data storage functions amongst the different computers 40, 50, 60 is generally conducted to provide independence and a central information store. Of course, more or less computers may be used.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some of the tools 30 include process controllers 80 that are adapted to automatically control the operating recipes of their respective tools 30. For example, if the tool 30 is a CMP tool, the process controller 80 may receive pre-polish thickness measurements (e.g., thickness of high features, thickness of low features) and predict a polishing time required to achieve a post-polish target thickness. The process controller 80 may use a performance model of the tool 30 to generate its prediction. In the case where the tool 30 is an etch tool, the process controller 80 may model the etching performance of the tool 30 based on pre-etch and/or post-etch thickness measurements. Using the model, the process controller 80 may determine operating recipe parameters such as etch time, plasma power, temperature, pressure, reactant gas concentrations, etc. to reduce post-etch thickness variations. Other control scenarios are possible with other types of processing tools.

Various tool events, such as maintenance procedures (e.g., chamber cleaning, polishing pad conditioning, consumable item replacement), calibrations, etc., may affect the operating characteristics of the tool 30, thus causing difficulty for the process controller 80 in maintaining the stability of its control algorithm. In some instances, it may take the process controller 80 numerous iterations to account for the operating characteristic change due to the tool event. Product processed during the interim may be defective. In other cases, it may be entirely impossible for the process controller 80 to handle the operating characteristic change.

The process controllers 80 are notified of tool events that have the potential for affecting the operating characteristics of their associated tools 30. Such notification may be conducted automatically or manually. For example, the process control server 50 may schedule maintenance activities and notify the process controllers 80 upon completion of the activities. Alternatively, the process controllers 80 may be capable of detecting certain tool events independently. For example, the process control 80 may detect the performance of a conditioning or cleaning recipe on the tool 30. In still another embodiment, a tool operator may signal the process controller 80 of the tool event through an operator interface 90 operating on the computer 40 (i.e., an operator may input the data after the scheduled maintenance on the tool has been performed).

In response to receiving a tool event notification, the process controller 80 may take a variety of actions to limit the likelihood of defective product processing. The specific actions may vary depending on the nature of the tool event and the control abilities of the process controller 80. Collectively, the actions taken in response to the tool event notification are referred to as initializing the process controller 80 based on the new operating characteristics of the tool 30.

In a first embodiment, the process controller 80 is adapted to control the tool 30 using a model or set of equations that include a processing characteristic of the tool 30. For example, in the control of a CMP tool, the blanket wafer removal rate (i.e., the rate at which the CMP tool removes material on a test wafer coated with a blanket layer of material) is used in a control model for determining the removal rate for the tool 30 over time. The largest impact on the removal rate is seen when new polishing pads are installed on the CMP tool. Smaller, yet noticeable, removal rate changes are seen when the polishing pads are conditioned. In response to receiving the tool event notification, the process controller 80 may communicate with the process control server 50 or a tool operator to force the processing of one or more test wafers in the tool 30 to determine a new blanket wafer removal rate. The qualification process may be reduced in scope compared to a full scale tool qualification procedure. Using the new blanket wafer removal rate, the process controller 80 may initialize its control model for subsequent processing runs.

In a second embodiment, the process controller 80 may be capable of estimating the effect of the new operating characteristics of the tool 30 on its control algorithm performance. For example, historical data may allow the process controller 80 to generate an approximate value for a control variable used in its performance model. For example, the effect on etch rate or deposition rate following an in situ cleaning of the chamber operation may be predictable. The process controller 80 then uses an approximate processing rate to initialize its control model for subsequent processing runs. The approximate value can be refined using feedback information provided by post-process metrology for the processing runs subsequent to the cleaning. Alternatively, as in the first example, the process controller 80 may force one or more test or qualification wafers to ensure process control stability.

In a third embodiment, the effect of the tool event may be so unpredictable that an estimate or limited qualification run is not suitable for initializing the process controller. For example, following a red-blue correlation in a stepper the overlay characteristics may be markedly different than before the procedure. In such a case, the process controller 80 may communicate with the process control server 50 or a tool operator to force a complete re-qualification of the tool 30 prior to allowing subsequent production.

Figure 2:
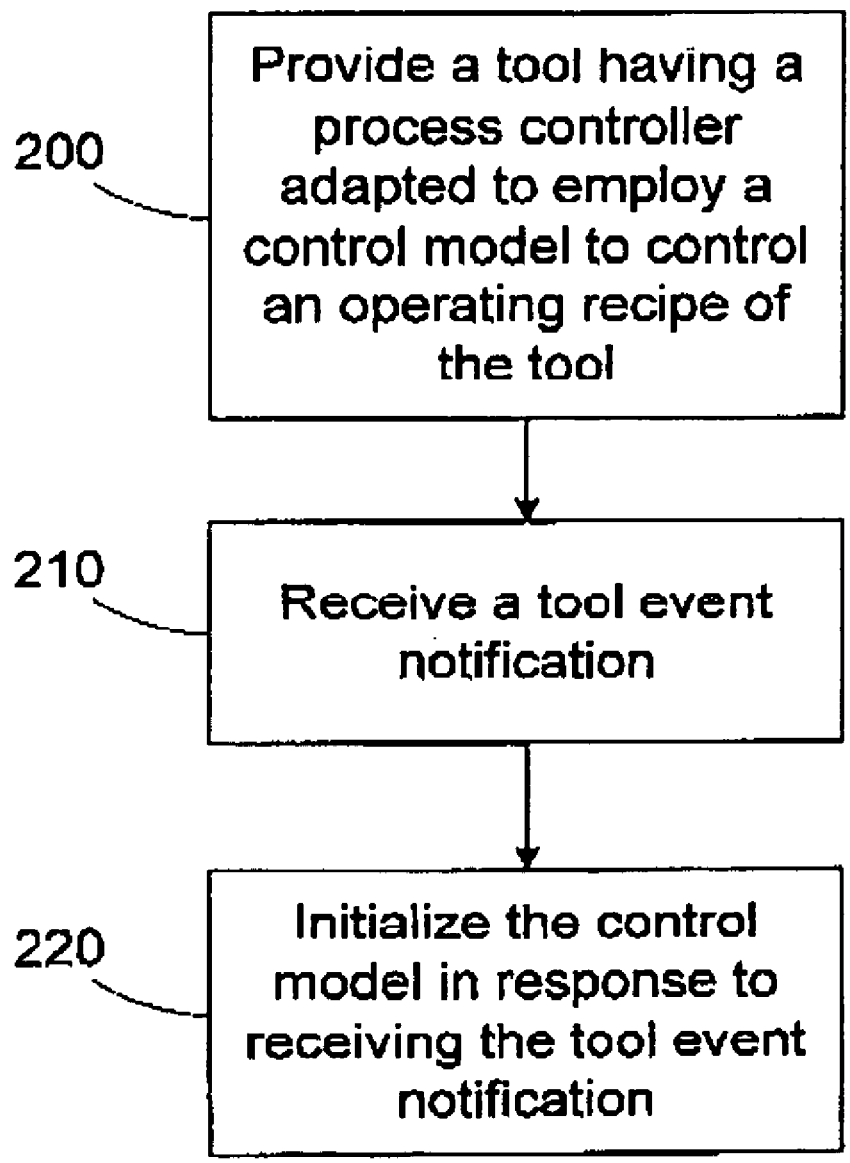
FIG. 2 is a simplified flow diagram of a method for initializing process controllers based on tool event data in accordance with another embodiment of the present invention.

Turning now to FIG. 2, a simplified flow diagram of a method for initializing process controllers based on tool event data is provided. In block 200, a tool 30 having a process controller 80 adapted to control an operating recipe of the tool is provided. In block 210, a tool event notification is received. The tool event notification may be associated with the performance of a preventative maintenance procedure (e.g., chamber cleaning, polishing pad conditioning, consumable item replacement), calibration, etc. In block 220, the process controller 80 is initialized in response to receiving the tool event notification. Initializing the process controller 80 may include estimating a control variable value associated with the process performed by the tool 30. Alternatively, initializing the process controller 80 may include performing a qualification procedure to determine the control variable value. The process controller 80 may interface with a process control server 50 responsible for directing the high level operation of the manufacturing system 10 to schedule the qualification procedure.

Automatically initializing the process controller 80 based on tool event notifications, as described above, has numerous advantages. Process deviations and control instabilities caused by changes in the operating characteristics of the tool 30 after the tool event may be address. The process controller 80 may initialize its control model using an estimated operating characteristic value. Alternatively, the process controller 80 may force a limited or full qualification process to provide inputs for initializing its control model. Also, tool operators and the manufacturing system 10 may be notified of actions required after tool events, thus reducing the likelihood of an operator inadvertently failing to perform qualification procedures.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for initializing process controllers based on tool event data, comprising:

providing a tool having a process controller adapted to employ a control model to control an operating recipe of the tool, wherein the tool comprises an etch tool adapted to etch features on a semiconductor wafer;

estimating a control variable value, wherein estimating the control variable value includes estimating an etch rate;

receiving a tool event notification; and initializing the control model in response to receiving the tool event notification and based on the estimated control variable value.

2. A method for initializing process controllers based on tool event data, comprising:

providing a tool having a process controller adapted to employ a control model to control an operating recipe of the tool, wherein the tool comprises a deposition tool adapted to form a layer on a semiconductor wafer;

estimating a control variable value, wherein estimating the control variable value includes estimating a deposition rate;
receiving a tool event notification; and
initializing the control model in response to receiving the tool event notification and based on the estimated control variable value.

3. A method for initializing process controllers based on tool event data, comprising:
providing a tool having a process controller adapted to employ a control model to control an operating recipe of the tool, wherein the tool comprises a polishing tool adapted to planarize a semiconductor wafer;
performing a qualification procedure on the tool in response to receiving the tool event notification to determine a control variable value, wherein performing the qualification procedure comprises processing a test wafer in the polishing tool to determine a blanket wafer removal rate;
receiving a tool event notification; and
initializing the control model in response to receiving the tool event notification and based on the control variable value.

4. A method for initializing process controllers based on tool event data, comprising:
providing a tool having a process controller adapted to employ a control model to control an operating recipe of the tool;
receiving a tool event notification;
initializing the control model in response to receiving the tool event notification, initializing the control model comprising:
performing a qualification procedure on the tool in response to receiving the tool event notification to determine a control variable value, wherein the tool comprises a photolithography stepper adapted to expose a photoresist layer on a semiconductor wafer, and performing the qualification procedure comprises processing a test wafer in the photolithography stepper to determine an overlay characteristic of the photolithography stepper; and
initializing the control model based on the control variable value.

5. A method for initializing process controllers based on tool event data, comprising:
providing a tool having a process controller adapted to employ a control model to control an operating recipe of the tool;
receiving a tool event notification;
initializing the control model in response to receiving the tool event notification, initializing the control model comprising:
performing a qualification procedure on the tool in response to receiving the tool event notification to determine a control variable value, wherein the tool comprises a deposition tool adapted to form a layer on a semiconductor wafer, and performing the qualification procedure comprises depositing the process layer on a test wafer in the deposition tool to determine a deposition rate; and
initializing the control model based on the control variable value.

6. A method for initializing process controllers based on tool event data, comprising:
providing a tool having a process controller adapted to employ a control model to control an operating recipe of the tool;
receiving a tool event notification;
initializing the control model in response to receiving the tool event notification, initializing the control model comprising:
performing a qualification procedure on the tool in response to receiving the tool event notification to determine a control variable value, wherein the tool comprises an etch tool adapted to etch features on a semiconductor wafer, and performing the qualification procedure comprises etching a test wafer in the etch tool to determine an etch rate; and
initializing the control model based on the control variable value.

7. A method for initializing process controllers based on tool event data, comprising:
providing a tool having a process controller adapted to employ a control model to control an operating recipe of the tool, wherein the tool comprises an etch tool having a chamber;
receiving a tool event notification, wherein receiving the tool event notification comprises receiving a notification when the chamber is cleaned; and
initializing the control model in response to receiving the tool event notification.

8. A method for initializing process controllers based on tool event data, comprising:
providing a tool having a process controller adapted to employ a control model to control an operating recipe of the tool, wherein the tool comprises a deposition tool having a chamber;
receiving a tool event notification, wherein receiving the tool event notification comprises receiving a notification when the chamber is cleaned; and
initializing the control model in response to receiving the tool event notification.

9. A method for initializing process controllers based on tool event data, comprising:
providing a tool having a process controller adapted to employ a control model to control an operating recipe of the tool;
receiving a tool event notification; and
initializing the control model in response to receiving the tool event notification, wherein the tool comprises a photolithography stepper adapted to expose a photoresist layer on a semiconductor wafer, and receiving the tool event notification comprises receiving a notification when a red-blue calibration is performed on the photolithography stepper.

10. A method for initializing process controllers based on tool event data, comprising:
providing a tool having a process controller adapted to employ a control model to control an operating recipe of the tool, wherein the tool comprises a polishing tool adapted to planarize a semiconductor wafer;
receiving a tool event notification;
performing a qualification procedure on the tool in response to receiving the tool event notification to determine a control variable, wherein performing the qualification procedure comprises processing a test wafer in the polishing tool to determine a blanket wafer removal rate; and
initializing the control model based on the control variable.

11. A method for initializing process controllers based on tool event data, comprising:

providing a tool having a process controller adapted to employ a control model to control an operating recipe of the tool;

receiving a tool event notification;

performing a qualification procedure on the tool in response to receiving the tool event notification to determine a control variable, wherein the tool comprises a photolithography stepper adapted to expose a photoresist layer on a semiconductor wafer, and performing the qualification procedure comprises processing a test wafer in the photolithography stepper to determine an overlay characteristic of the photolithography stepper; and initializing the control model based on the control variable.

12. A method for initializing process controllers based on tool event data, comprising:

providing a tool having a process controller adapted to employ a control model to control an operating recipe of the tool;

receiving a tool event notification;

performing a qualification procedure on the tool in response to receiving the tool event notification to determine a control variable, wherein the tool comprises a deposition tool adapted to form a layer on a semiconductor wafer, and performing the qualification procedure comprises depositing the process layer on a test wafer in the deposition tool to determine a deposition rate; and initializing the control model based on the control variable.

13. A method for initializing process controllers based on tool event data, comprising:

providing a tool having a process controller adapted to employ a control model to control an operating recipe of the tool;

receiving a tool event notification;

performing a qualification procedure on the tool in response to receiving the tool event notification to determine a control variable, wherein the tool comprises an etch tool adapted to etch features on a semiconductor wafer, and performing the qualification procedure comprises etching a test wafer in the etch tool to determine an etch rate; and initializing the control model based on the control variable.

14. A method for initializing process controllers based on tool event data, comprising:

providing a tool having a process controller adapted to employ a control model to control an operating recipe of the tool, wherein the tool comprises an etch tool having a chamber, receiving a tool event notification, wherein receiving the tool event notification comprises receiving a notification when the chamber is cleaned;

performing a qualification procedure on the tool in response to receiving the tool event notification to determine a control variable; and initializing the control model based on the control variable.

15. A method for initializing process controllers based on tool event data, comprising:

providing a tool having a process controller adapted to employ a control model to control an operating recipe of the tool, wherein the tool comprises a deposition tool having a chamber receiving a tool event notification, wherein receiving the tool event notification comprises receiving a notification when the chamber is cleaned;

performing a qualification procedure on the tool in response to receiving the tool event notification to determine a control variable; and initializing the control model based on the control variable.

16. A method for initializing process controllers based on tool event data, comprising:

providing a tool having a process controller adapted to employ a control model to control an operating recipe of the tool;

receiving a tool event notification, wherein the tool comprises a photolithography stepper adapted to expose a photoresist layer on a semiconductor wafer, and receiving the tool event notification comprises receiving a notification when a red-blue calibration is performed on the photolithography stepper;

performing a qualification procedure on the tool in response to receiving the tool event notification to determine a control variable; and initializing the control model based on the control variable.

17. A manufacturing system, comprising:

a tool adapted to process wafers in accordance with an operating recipe;

process controller adapted to control the operating recipe in accordance with a control model, wherein the process controller is further adapted to receive a tool event notification and initialize the control model in response to receiving the tool event notification; and a process control server adapted to send the tool event notification to the process controller.

18. A manufacturing system, comprising:

a tool adapted to process wafers in accordance with an operating recipe wherein the tool comprises an etch tool adapted to etch features on a semiconductor wafer; and a process controller adapted to control the operating recipe in accordance with a control model, wherein the process controller is further adapted to receive a tool event notification and initialize the control model in response to receiving the tool event notification, and wherein the process controller is adapted to estimate a control variable value and initialize the control model based on the estimated control variable value, and the estimated control variable value comprises an etch rate.

19. A manufacturing system, comprising:

a tool adapted to process wafers in accordance with an operating recipe wherein the tool comprises a deposition tool adapted to form a layer on a semiconductor wafer; and a process controller adapted to control the operating recipe in accordance with a control model, wherein the process controller is further adapted to receive a tool event notification and initialize the control model in response to receiving the tool event notification, and wherein the process controller is adapted to estimate a control variable value and initialize the control model based on the estimated control variable value, and the estimated control variable value comprises a deposition rate.

20. The manufacturing system of claim 17, wherein the process controller is adapted to contact the process control server to schedule a qualification procedure on the tool in response to receiving the tool event notification.

21. The manufacturing system of claim 20, wherein the tool is adapted to perform the qualification procedure, and the process controller is configured to determine a control variable value based on the qualification procedure.

22. The manufacturing system of claim 21, wherein the tool comprises a polishing tool adapted to planarize a semiconductor wafer, the qualification procedure comprises processing a test wafer in the polishing tool, and the process controller is configured to determine a blanket wafer removal rate as the control variable value.

23. A manufacturing system, comprising:
  a tool adapted to process wafers in accordance with an operating recipe;
  a process controller adapted to control the operating recipe in accordance with a control model, wherein the process controller is further adapted to receive a tool event notification and initialize the control model in response to receiving the tool event notification; and
  a process control server adapted to send the tool event notification to the process controller, wherein the process controller is adapted to contact the process control server to schedule a qualification procedure on the tool in response to receiving the tool event notification, and wherein the tool is adapted to perform the qualification procedure, and the process controller is configured to determine a control variable value based on the qualification procedure, and wherein the tool comprises a photolithography stepper adapted to expose a photoresist layer on a semiconductor wafer, the qualification procedure comprises processing a test wafer in the photolithography stepper, and the process controller is configured to determine an overlay characteristic of the photolithography stepper.

24. A manufacturing system, comprising:
  a tool adapted to process wafers in accordance with an operating recipe;
  a process controller adapted to control the operating recipe in accordance with a control model, wherein the process controller is further adapted to a receive a tool event notification and initialize the control model in response to receiving the tool event notification; and
  a process control server adapted to send the tool event notification to the process controller, wherein the process controller is adapted to contact the process control server to schedule a qualification procedure on the tool in response to receiving the tool event notification, and wherein the tool is adapted to perform the qualification procedure, and the process controller is configured to determine a control variable value based on the qualification procedure, and wherein the tool comprises an etch tool adapted to etch features on a semiconductor wafer, the qualification procedure comprises etching a test wafer in the polishing tool, and the process controller is configured to determine an etch rate as the control variable value.

25. A manufacturing system, comprising:
  a tool adapted to process wafers in accordance with an operating recipe;
  a process controller adapted to control the operating recipe in accordance with a control model, wherein the process controller is further adapted to receive a tool event notification and initialize the control model in response to receiving the tool event notification; and
  a process control server adapted to send the tool event notification to the process controller, wherein the process controller is adapted to contact the process control server to schedule a qualification procedure on the tool in response to receiving the tool event notification, and wherein the tool is adapted to perform the qualification procedure, and the process controller is configured to determine a control variable value based on the qualification procedure, and wherein the tool comprises a deposition tool adapted to form a process layer on a semiconductor wafer, the qualification procedure comprises forming the process layer on a test wafer in the deposition tool, and the process controller is configured to determine a deposition rate as the control variable value.

26. A manufacturing system, comprising:
  a tool adapted to process wafers in accordance with an operating recipe, wherein the tool comprises an etch tool having a chamber; and
  a process controller adapted to control the operating recipe in accordance with a control model, wherein the process controller is further adapted to receive a tool event notification and initialize the control model in response to receiving the tool event notification and the tool event notification comprises a notification that the chamber has been cleaned.

27. A manufacturing system, comprising:
  a tool adapted to process wafers in accordance with an operating recipe, wherein the tool comprises a deposition tool having a chamber; and
  a process controller adapted to control the operating recipe in accordance with a control model, wherein the process controller is further adapted to receive a tool event notification and initialize the control model in response to receiving the tool event notification, and the tool event notification comprises a notification that the chamber has been cleaned.

28. A manufacturing system, comprising:
  a tool adapted to process wafers in accordance with an operating recipe; and
  a process controller adapted to control the operating recipe in accordance with a control model, wherein the process controller is further adapted to receive a tool event notification and initialize the control model in response to receiving the tool event notification, wherein the tool comprises a photolithography stepper adapted to expose a photoresist layer on a semiconductor wafer, and the tool event notification comprises a notification that a red-blue calibration has been performed on the photolithography stepper.

* * * * *